United States Patent [19]

Yoshimura et al.

[11] 4,276,214

[45] Jun. 30, 1981

[54] FLUORINE-CONTAINING RESIN COMPOSITION HAVING IMPROVED THERMAL STABILITY

[75] Inventors: Tatsushiro Yoshimura, Takatsuki; Shigetake Tominaga, Ibaraki, both of Japan

[73] Assignee: Daikin Kogyo Co., Ltd., Osaka, Japan

[21] Appl. No.: 46,047

[22] Filed: Jun. 6, 1979

[30] Foreign Application Priority Data

Jun. 9, 1978 [JP] Japan .................................. 53/70202
Jun. 9, 1978 [JP] Japan .................................. 53/70203

[51] Int. Cl.$^3$ .......................... C08K 5/58; C08K 5/57; C08K 3/10; C08K 5/43; C08K 5/18
[52] U.S. Cl. ..................... 260/45.75 K; 260/45.75 W; 260/42.22; 260/42.27; 260/45.75 S; 260/45.8 N; 260/45.8 NZ; 260/45.9 NC; 260/45.75 C; 260/45.9 QB
[58] Field of Search ................. 260/45.75 K, 45.75 A, 260/45.75 W, 45.9 NC, 45.75 S, 45.8 N, 45.8 NZ, 42.22, 42.27, 45.9 QB; 428/421, 422

[56] References Cited

U.S. PATENT DOCUMENTS

| | | | |
|---|---|---|---|
| 2,914,506 | 11/1959 | Mack et al. .................... 260/45.75 T |
| 3,377,193 | 4/1968 | Stilmar .............................. 260/42.22 |
| 3,454,517 | 7/1969 | Neros et al. ........................... 428/421 |
| 3,557,051 | 1/1971 | Kometani et al. ........... 260/45.9 QB |
| 3,634,283 | 1/1972 | Rozner et al. .................... 260/42.22 |
| 3,709,776 | 1/1973 | Fuchs et al. .......................... 428/421 |
| 3,745,145 | 7/1973 | Khattab et al. ............... 260/45.85 R |
| 4,011,194 | 3/1977 | Sandler ......................... 260/45.75 C |
| 4,110,308 | 8/1978 | Abe et al. .......................... 260/42.22 |
| 4,115,352 | 9/1978 | Bohen et al. .................. 260/45.85 S |
| 4,120,608 | 10/1978 | Vassiliou ............................. 428/422 |
| 4,154,876 | 3/1979 | Segawa et al. ....................... 428/421 |

FOREIGN PATENT DOCUMENTS 47-5418 2/1972 Japan .
48-37980 11/1973 Japan .
48-37981 11/1973 Japan .
48-38215 11/1973 Japan .
47-87738 8/1974 Japan .

*Primary Examiner*—V. P. Hoke
*Attorney, Agent, or Firm*—Armstrong, Nikaido, Marmelstein & Kubovcik

[57] ABSTRACT

A melt-processable fluorine-containing resin composition having an improved thermal stability which comprises a tetrafluoroethylene copolymer, a chlorotrifluoroethylene homo- or co-polymer, or a vinylidene fluoride homo- or co-polymer and at least one thermal stabilizer selected from the group consisting of an amine antioxidant, an organosulfurous compound, an organo tin antioxidant, a tin powder and a zinc powder. The composition can be advantageously processed without causing any trouble even at an optimum sintering temperature of the fluorine-containing resin.

9 Claims, 3 Drawing Figures

FLUORINE-CONTAINING RESIN COMPOSITION HAVING IMPROVED THERMAL STABILITY

BACKGROUND OF THE INVENTION

The present invention relates to a melt-processable fluorine-containing resin composition having an excellent thermal stability, and more particularly to the composition comprising a tetrafluoroethylene (hereinafter referred to as "TFE") copolymer, a chlorotrifluoroethylene (hereinafter referred to as "CTFE") homo- or co-polymer or a vinylidene fluoride (hereinafter referred to as "VdF") homo- or co-polymer, and a thermal stabilizer, which has an improved thermal stability to high-temperature sintering and is processable under wider processing conditions with technical and economical advantages and also can provide an article having excellent physical properties.

TFE copolymers and CTFE or VdF homopolymer and copolymers are melt-processable fluorine-containing resins having especially high thermal resistance among those put on the market, and for instance, as the former there are known TFE-hexafluoropropylene copolymer, perfluorovinyl ether-TFE copolymer, ethylene-TFE copolymer and ethylene-propylene-TFE copolymer and as the latter there are, for example, known CTFE and VdF homopolymer, ethylene-CTFE copolymer and VdF-TFE copolymer. These melt-processable fluorine-containing resins have melt-flowability, that is, the melt viscosity of these resins is generally lower than $10^6$ poises at an optimum processing temperature and, therefore, they provide a film having less pinholes and voids as compared with polytetrafluoroethylene which has an excellent chemical and corrosion resistance but has no melt-flowability or melt-processability, since it has an extremely high melt viscosity of from $10^{10}$ to $10^{11}$ poises even at a processing temperature, i.e. about 380° C.

However, the thermal stability of these melt-processable resins at high temperatures in the vicinity of their sintering temperatures is inferior to that of polytetrafluoroethylene, and this causes trouble in processing. For instance, the TFE-hexafluoropropylene powder causes a problem that a part of a resin decomposes and gasifies to cause foaming in the film upon sintering, when a coating composition is applied in a thickness of more than 100μ per one application. Therefore, when it is desired to obtain a film, e.g. a corrosion resistant lining having a thickness of 1,000μ, in general a coating composition must be applied repeatedly in more than 10 layers and disadvantages in process is unavoidable. Also, even in a case where a film having a thickness of less than 100μ is formed by one coating process, the film is liable to include bubbles partly inside the film. That is to say, when the resins are heated at a suitable sintering temperature of 340° to 380° C. for a long time more than 30 minutes, the resins partially cause thermal deterioration, and particularly when the coated film is considerably thick, bubbles are formed in the film inevitably. This phenomenon is accelerated by the influence of oxygen in air.

For this reason, for instance, in case of TFE-hexafluoropropylene resin, there were proposed (1) a process in which thickness of a coating per one application is made as small as possible (about 50μ) and the application and sintering procedures must be repeated many times until a sintered film reaches a desired thickness, and (2) a process in which a resin having a low molecular weight (of which melt viscosity is about $0.5 \times 10^4$ to about $7 \times 10^4$ poises at 380° C.) or a resin obtained by heat treatment of a high molecular weight resin (the melt viscosity of the high molecular weight resin is from about $1 \times 10^5$ to about $4 \times 10^5$ poises at 380° C.) is employed for a coating composition so that the resin melts and flows at a lower temperature, and the coating is sintered at a lower temperature (320° to 340° C.) to give a sintered film.

However, the above process (1) has the disadvantage that the formation of a film having a thickness necessary in general for corrosion resistant linings, i.e. about 600 to about 1,000μ, requires much labor and time in application and sintering.

Also, the above process (2) results in the formation of bubbles and a coated film when the thickness of the film per one application exceeds 100μ, even though the sintering has been conducted at a lower temperature (320° to 340° C.). Therefore, when it is desired to obtain a film having a thickness of more than 1,000μ, the application and sintering must be repeated more than 10 times as in the process (1). Thus, the process (2) is also low in productivity and is not economical. Further, a low molecular weight resin is inferior in stress crack resistance and solvent crack resistance and is not desirable as a corrosion resistant material. Moreover, thermal resistance of such a resin is low, the allowable range for processing temperature and period of time are narrow, and the thermal deterioration of resin may take place during the processing. And further such a low molecular weight resin is liable to result in runs during the processing. When a lining is made on an industrial scale for a large-sized substrate, for instance, having a length of more than one meter or a substrate having an irregular thickness, temperature distribution on the surface of the substrate and difference in heat history become, of course large, and in such a case a uniform lining of good quality is hard to obtain by the process (2).

Also, in case of ethylene-propylene-TFE copolymer and ethylene-CTFE copolymer, the bubble formation upon sintering after powder coating is not so severe as with TFE-hexafluoroproylene copolymer. However, when the sintering for a long time is required owing to the size and shape of a substrate to be coated, it accompanies deterioration of the resin, and as a result, the obtained film is discolored and also the durability to various environments and chemical reagents is remarkably impaired.

There are known various processes for improving the thermal stability of these fluorine-containing resins upon sintering. For instance, Japanese Unexamined Patent Publication Nos. 122155/1976 and 122156/1976 disclose processes for improving the thermal stability of the resins by admixing two kinds of TFE-hexafluoropropylene copolymer with different melt viscosities which are thermally treated at a high temperature in the presence of steam. These processes require not only the thermal treatment of TFE-hexafluoropropylene copolymer at a high temperature of 340° to 380° C. for 2 to 5 hours, but also drying for several hours to remove moisture because of the thermal treatment in the presence of steam, and accordingly is not economical.

It is also known to use, as a thermal stabilizer for ethylene-TFE copolymer, sulfates of metals of Group IV-A of the Periodic Table such as Sn and Pb as disclosed in Japanese Patent Publication No. 37980/1973;

phosphates of alkali metals, barium or metals of Group IV-A of the Periodic Table as disclosed in Japanese Patent Publication No. 37981/1973; a combination of organo phosphites and phosphates of alkali metals, barium or metals of Group IV-A of the Periodic Table as disclosed in Japanese Patent Publication No. 38215/1973; and α-alumina as disclosed in Japanese Unexamined Patent Publication No. 87738/1974. However, these thermal stabilizers merely inhibit the discoloration by thermal degradation of ethylene-TFE copolymer in the sintering at 300° C. within 30 minutes, and are not suitable for use in coating a substrate to be coated having a large size and a large heat capacity.

SUMMARY OF THE INVENTION

Figure 1:
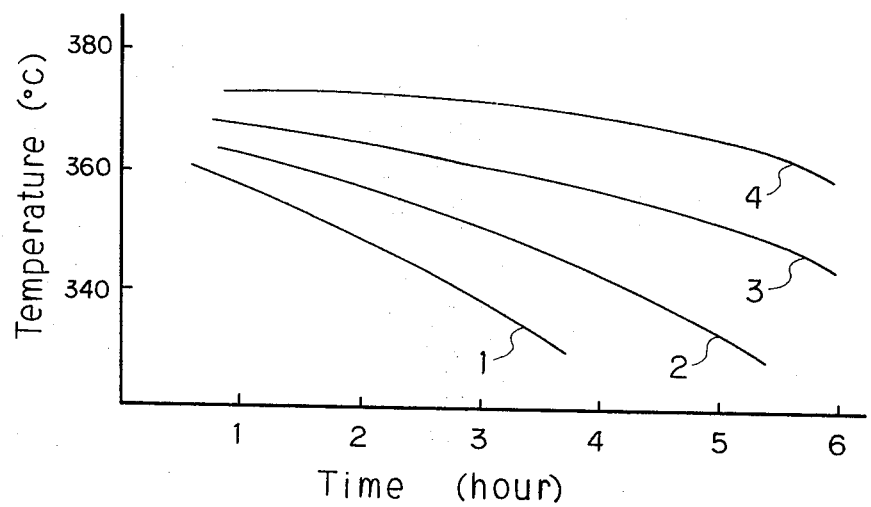
FIGS. 1, 2 and 3 are graphs showing critical sintering conditions of the melt-processable fluorine-containing resin compositions of the present invention which contain metal powders as thermal stabilizers.

The present invention provides a melt-processable fluorine-containing resin composition having an improved thermal stability which comprises a melt-processable fluorine-containing resin selected from the group consisting of a tetrafluoroethylene copolymer, chlorotrifluoroethylene homopolymer, a chlorotrifluoroethylene copolymer, vinylidene fluoride homopolymer and a vinylidene fluoride copolymer, and at least one thermal stabilizer selected from the group consisting of an amine antioxidant, an organosulfurous compound, an organo tin antioxidant, a tin powder and a zinc powder.

According to the present ivention, the composition can be applied with a large thickness per one application and can be sintered under temperature and time conditions, of which allowable ranges are wide, to give a film having excellent chemical and thermal resistances.

DETAILED DESCRIPTION

The melt-processable fluorine-containing resins employed in the present invention are TFE copolymers, CTFE homo- and co-polymers, VdF homo- and co-polymers mainly containing TFE, CTFE or VdF, and their homo- and co-polymers modified with other co-polymerizable monomers, and moreover are those melt-flowable with heating. These resins include (1) TFE-hexafluoropropylene copolymers containing residues of TFE and hexafluoropylene in a weight ratio of 95:5 to 75:25, (2) TFE-perfluorovinyl ether copolymers containing residues of TFE and perfluorovinyl ether in a weight ratio of 98:2 to 90:10, (3) TFE-ethylene copolymers containing residues of TFE and ethylene in a weight ratio of 70:30 to 90:10, and (4) TFE-ethylene-propylene copolymers containing residues of TFE, ethylene and propylene in a weight ratio of 40 to 60:25 to 50:2 to 20, (5) CTFE homopolymer, (6) CTFE-ethylene copolymers containing residues of CTFE and ethylene in a weight ratio of 75:25 to 85:15, (7) VdF homopolymer, (8) VdF-TFE copolymers containing residues of VdF and TFE in a weight ratio of 70:30 to 90:10 and (9) VdF-hexafluoroisobutylene copolymers containing residues of VdF and hexafluoroisobutylene in a weight ratio of 40:60 to 70:30. These homopolymers and copolymers may be modified with other copolymerizable monomers such as propylene, isobutylene, vinyl fluoride, vinylidene fluoride, trifluoroethylene, hexafluoropropylene and hexafluoroisobutene, and the modified polymers can also be employed in the present invention. There are preferably employed in the present invention the abovementioned resins having a particle size of 32 meshes (sieve opening: 495μ) pass, especially 60 meshes (sieve opening: 246μ) pass.

In the present invention, it is necessary to employ, as a thermal stabilizer, at least one member selected from (a) an amine antioxidant, (b) an organosulfurous compound, (c) an organo tin antioxidant and (d) a tin and/or zinc metal powder.

The amine antioxidants usable in the present invention are antioxidants usually employed for polyolefin resins, and include dinaphthylamine, phenyl-α-naphthylamine, phenyl-β-naphthylamine, diphenyl-p-phenylenediamine, di-β-naphthyl-p-phenylenediamine, phenylcyclohexyl-p-phenylene diamine, aldol-α-naphthyl-diphenylamine, and their derivatives such as those obtained by introducing a substituent group to phenyl or naphthyl group of the above antioxidants, e.g. a reaction product of diphenylamine and diisobutylene, and a diphenylamine derivative having the following general formula [I]:

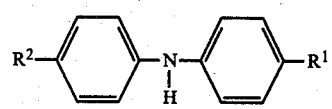

[I]

wherein R¹ and R² are

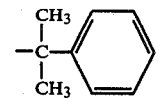

or octyl group.

These amine antioxidants may be employed singly or in admixture thereof.

Examples of the organosulfurous compound employed in the present invention are benzoimidazole type mercaptan compounds and their salts having the following general formula [II]:

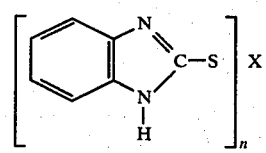

[II]

wherein X is H, Zn, Sn or Cd atom, and n is an integer of 1 to 4, benzothiazole type mercaptan compounds and their salts having the following general formula [III]:

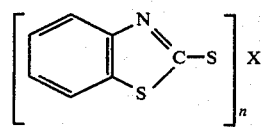

[III]

wherein X is H, Zn, Sn or Cd atom, and n is an integer of 1 to 4, dithiocarbamic acids and their salts having the following general formula [IV]:

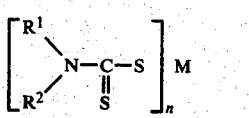

wherein $R^1$ and $R^2$ are an alkyl or aryl group having 2 to 16 carbon atoms, M is H, Zn, Sn, Cd or Cu atom, and n is an integer of 1 to 4, thiuram compounds, e.g. thiuram monosulfide, having the following general formula [V]:

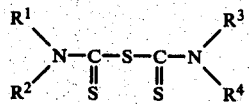

wherein $R^1$, $R^2$, $R^3$ and $R^4$ are an alkyl or aryl group having 2 to 16 carbon atoms, thiuram compounds, e.g. thiuram disulfide, having the following general formula [VI]:

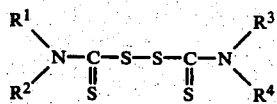

wherein $R^1$, $R^2$, $R^3$ and $R^4$ are an alkyl or aryl group having 2 to 16 carbon atoms.

These organosulfurous compounds may be employed singly or in admixture thereof.

Organo tin compounds having the following general formula [VII]:

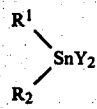

wherein $R^1$ and $R^2$ are the same or different and each is an alkyl or aryl group having 2 to 16 carbon atoms, and Y is a residue of an acid, an alcohol or an mercaptan from which hydrogen atom is removed so as to bond to tin atom, are employed as the organo tin antioxidant in the present invention. Typical examples of the organo tin antioxidant are dialkyl, alkylaryl or diaryl tin mercaptides, and dialkyl, alkylaryl or diaryl tin maleates.

The particle size of the above-mentioned organic stabilizers is not particularly restricted, but those having a particle size of not more than 70μ are preferably employed.

Commercially available tin and zinc metal powders are suitably employed in the present invention. Particularly, from a viewpoint of dispersibility into resin it is preferred to employ the metal powder having a particle size of not more than 30 meshes pass, especially not more than 60 meshes pass, and in general the metal powder having an apparent dry sieve size of not more than 100 to 200 meshes is employed. The tin powder and zinc powder may be employed singly or in admixture thereof.

The above-mentioned organic compounds employed as the thermal stabilizer in the present invention have been considered to be ineffective as thermal stabilizers for fluorine-containing resins which melt at a high temperature, since they rapidly thermally decompose and gasify in a temperature range of about 300° to about 400° C. which is the sintering temperature of the melt-processable fluorine-containing resins. In fact, phenol type antioxidants widely employed for polyolefins have no effect as the thermal stabilizer on the melt-processable fluorine-containing resins employed in the invention or impair the thermal stability, even if they are employed singly or in combination with other phenol type antioxidants.

The organic compounds employed as the thermal stabilizers in the present invention have a surprising effect of thermally stabilizing the melt-processable fluorine-containing resins when they are employed singly or in particular in combination of two or more kinds of the stabilizer, despite that about 80% by weight decomposes and gasifies at a temperature of about 380° C., and the fluorine-containing resins can be maintained stable during sintering over several hours.

The thermal stabilizer is employed in an amount of 0.05 to 10 parts by weight, preferably 0.1 to 5 parts by weight, more preferably 0.5 to 3 parts by weight, per 100 parts by weight of the melt-processable fluorine-containing resin. When the amount of the stabilizer is smaller than the above range, the effect of improving the stablity is poor. Also, when the amount is larger than the above range, the obtained film is colored or the chemical resistance of the film is decreased.

Any known other additives may suitably added to the fluorine-containing resin composition of the present invention, e.g. pigments such as carbon black, titanium dioxide and cobalt oxide, reinforcing agents such as glass or carbon fiber powder and mica, leveling agents, and antistatic agents.

The fluorine-containing resin composition of the present invention may be employed in the form of solid for molding processing, or in the form of dispersion or slurry wherein the composition is dispersed in an organic medium or an aqueous medium.

Any of dry and wet methods may be applicable to blending the melt-processable fluorine-containing resin and the thermal stabilizer, and is suitably selected according to the desired form of the composition for use. When it is desired to obtain the composition suited for use in powder coating, it is, of course, preferable to conducting the blending in the form of powder, and in which usual blenders and pulverizers such as a Hosokawa Micro Sample Mill made by Hosokawa Tekkosho Kabushiki Kaisha, V shaped blender, cone shaped blender and Ribbon Blender made by Fuji Sangyo Co., Ltd. may be employed without particular limitation. In case of the organic stabilizers, it is necessary to conduct the blending at a temperature of less than about 200° C. so that the stabilizers are not influenced by heat, and for the same reason it is also necessary to take care so that the composition is not subjected to the influence of heat at a temperature higher than about 200° C. prior to using it for coating. When the blending is carried out by a wet process, the fluorine-containing resin and the stabilizer are blended in water, in an organic solvent such as toluene, xylene, chloroform, perchloroethylene, trichloroethylene or an alcohol, or in a mixture of water and the organic solvent. In case of using water as a medium, in order to uniformly disperse the thermal stabilizer it is preferred to add a surface active agent such as sodium alkylbenzenesulfonate, sodium alkylsulfate, polyethyleneglycol alkylphenyl ether, polyethyleneglycol alkyl ether or ammonium perchlorofluorocaprylate. The wet blending is conducted by employing any apparatuses for agitation or blending such as ball mill, vibrating ball mill, sand mill and roll mill without particular limitation.

The present invention is more particularly described and explained by means of the following Examples and Comparative Examples, in which all parts are by weight unless otherwise noted.

EXAMPLES 1 TO 44 AND COMPARATIVE EXAMPLE 1

A 50 liter kneader having four agitating blades (commercially available under the tradename "Speed Kneader" made by Showa Engineering Kabushiki Kaisha) was charged with 10 kg. of TFE-hexafluoropropylene (hexafluoropropylene being hereinafter referred to as "HFP") copolymer (TFE/HFP=88/12 by weight) having a particle size of 60 meshes pass and a prescribed amount of a thermal stabilizer shown in Table 1, and the agitating blades were rotated for 30 minutes at a speed of 1,500 r.p.m. to give a fluorine-containing resin composition in the form of powder.

A rectangular frame having a size of 10 cm.×5 cm. was placed on an aluminum plate, and the composition in the form of powder was placed in the frame in an amount calculated on the basis of the specific gravity of the obtained film after sintering so that the film may have a thickness of 50μ, 100μ, 150μ, 200μ, 250μ, 300μ or 600μ. After removing the frame gently, the composition on the aluminum plate was sintered in an electric oven at a temperature of 345°±5° C. for 2 hours.

After the completion of the sintering, appearance of the obtained film was observed, and it was as represented in Table 1 according to the following criteria.

X: State of bubble formation in the film having a thickness of 100μ obtained in Comparative Example 1 in which no thermal stabilizer was used. In this case, an infinite number of bubbles having a diameter of not more than 1 mm. were present, and this state of bubble formation was made standard on determining the state of bubble formation of other films.

XX: State of bubble formation being inferior to the above standard film

△: State of bubble formation being improved to some extent as compared with the standard film ○: Only several bubbles being present ⊚: No bubbles being observed.

Although the films were prepared by a method different from usual powder coating method in order to adjust exactly the thickness of the films, the above sintering conditions are approximately the same as those applied to the practical powder coating, and it was also confirmed that the state of bubble formation well corresponded to that in the practical powder coating.

The results are shown in Table 1.

TABLE 1

| | Thermal stabilizer | Amount | State of films | | | | | | |
|---|---|---|---|---|---|---|---|---|---|
| | Kind | (PHR) | 50μ | 100μ | 150μ | 200μ | 250μ | 300μ | 600μ |
| Com. Ex. 1 | — | — | ○ | X | XX | XX | XX | XX | XX |
| Ex. 1 | Phenyl-β-Naphthylamine | 1 | ⊚ | △ | X | XX | XX | XX | XX |
| Ex. 2 | " | 2 | ⊚ | ⊚ | ⊚ | ○ | X | XX | XX |
| Ex. 3 | Di-β-naphthyl-p-phenylenediamine | 0.5 | ⊚ | △ | △ | XX | XX | XX | XX |
| Ex. 4 | " | 1 | ⊚ | ⊚ | ⊚ | ○ | ○ | △ | XX |
| Ex. 5 | " | 2 | ⊚ | ⊚ | ⊚ | ⊚ | ⊚ | ⊚ | ○ |
| Ex. 6 | Reaction product of diphenylamine and diisobutylene | 0.5 | ⊚ | ⊚ | △ | X | X | X | XX |
| Ex. 7 | Reaction product of diphenylamine and diisobutylene | 1 | ⊚ | ⊚ | ⊚ | △ | X | X | XX |
| Ex. 8 | Reaction product of diphenylamine and diisobutylene | 2 | ⊚ | ⊚ | ⊚ | ⊚ | ○ | ○ | X |
| Ex. 9 | 4,4'-Bis(α,α'-dimethylbenzyl)diphiphenylamine | 0.5 | ○ | △ | X | XX | XX | XX | X |
| Ex. 10 | " | 1 | ⊚ | ○ | ○ | △ | △ | △ | XX |
| Ex. 11 | " | 2 | ⊚ | ⊚ | ⊚ | ○ | ○ | ○ | X |
| Ex. 12 | 2-Mercaptobenzoimidazole | 1 | ⊚ | ○ | ○ | ○ | △ | X | XX |
| Ex. 13 | " | 2 | ⊚ | ○ | ○ | ○ | ○ | ○ | X |
| Ex. 14 | Zinc salt of 2-mercaptobenzoimidazole | 1 | ⊚ | ○ | ○ | ○ | ○ | ○ | X |
| Ex. 15 | " | 2 | ⊚ | ⊚ | ⊚ | ⊚ | ⊚ | ⊚ | △ |
| Ex. 16 | 2-Mercaptobenzothiazole | 1 | ⊚ | ⊚ | ○ | △ | X | X | XX |
| Ex. 17 | " | 2 | ⊚ | ⊚ | ○ | ○ | ○ | ○ | XX |
| Ex. 18 | Zinc salt of 2-mercaptobenzothiazole | 1 | ⊚ | ⊚ | ⊚ | ○ | ○ | ○ | XX |
| Ex. 19 | " | 2 | ⊚ | ⊚ | ⊚ | ⊚ | ⊚ | ⊚ | ○ |
| Ex. 20 | Zinc ethylphenyldithiocarbamate | 1 | ⊚ | ⊚ | ○ | ○ | △ | X | XX |
| Ex. 21 | " | 2 | ⊚ | ⊚ | ⊚ | ○ | ○ | ○ | X |
| Ex. 22 | Zinc dibutyldithiocarbamate | 1 | ⊚ | ⊚ | ○ | ○ | △ | X | XX |
| Ex. 23 | " | 2 | ⊚ | ⊚ | ⊚ | ○ | ○ | △ | XX |
| Ex. 24 | Tetramethylthiuram disulfide | 1 | ⊚ | ⊚ | △ | X | X | X | XX |
| Ex. 25 | " | 2 | ⊚ | ⊚ | ○ | X | X | X | XX |
| Ex. 26 | Dibutyl tin maleate | 1 | ⊚ | △ | X | X | X | X | XX |
| Ex. 27 | " | 2 | ⊚ | ○ | △ | X | X | X | XX |
| Ex. 28 | Dibutyl tin mercaptide* | 1 | ⊚ | ○ | ○ | ○ | △ | X | XX |
| Ex. 29 | " | 2 | ⊚ | ⊚ | ⊚ | ⊚ | ⊚ | ⊚ | △ |
| Ex. 30 | Mixture of zinc dibutyldithiocarbamate and di-β-naphthyl-p-phenylenediamine (1 : 1 by weight) | 1 | ⊚ | ⊚ | ⊚ | ○ | ○ | △ | XX |
| Ex. 31 | Mixture of zinc dibutyldithiocarbamate and di-β-naphthyl-p-phenylenediamine (1 : 1 by weight) | 2 | ⊚ | ⊚ | ⊚ | ⊚ | ⊚ | ⊚ | ⊚ |
| Ex. 32 | Mixture of 2-mercaptobenzothiazole and phenyl-β-naphthylamine (1 : 1 by weight) | 1 | ⊚ | ⊚ | ○ | ○ | △ | △ | XX |
| Ex. 33 | Mixture of 2-mercaptobenzothiazole and phenyl-β-napthylamine (1 : 1 by weight) | 2 | ⊚ | ⊚ | ⊚ | ⊚ | ○ | ○ | XX |
| Ex. 34 | Mixture of dibutyl tin mercaptide and 2-mercaptobenzoimidazole | 1 | ⊚ | ⊚ | ⊚ | ⊚ | ○ | ○ | △ |

TABLE 1-continued

| | Thermal stabilizer | | State of films | | | | | | |
|---|---|---|---|---|---|---|---|---|---|
| | Kind | Amount (PHR) | 50μ | 100μ | 150μ | 200μ | 250μ | 300μ | 600μ |
| Ex. 35 | Mixture of dibutyl tin mercaptide and 2-mercaptobenzoimidazole (1 : 2 by weight) | 2 | ⊚ | ⊚ | ⊚ | ⊚ | ⊚ | ⊚ | ⊚ |
| Ex. 36 | Mixture of dibutyl tin mercaptide and zinc salt of 2-mercaptobenzothiazole (1 : 1 by weight) | 1 | ⊚ | ⊚ | ⊚ | ○ | ○ | ○ | △ |
| Ex. 37 | Mixture of dibutyl tin mercaptide and zinc salt of 2-mercaptobenzothiazole (1 : 1 by weight) | 2 | ⊚ | ⊚ | ⊚ | ⊚ | ⊚ | ⊚ | ⊚ |
| Ex. 38 | Mixture of 4,4'-bis(α,α'-dimethylbenzyl diphenylamine and zinc salt of 2-mercaptobenzothiazole | 1 | ⊚ | ⊚ | ⊚ | ⊚ | ○ | ○ | △ |
| Ex. 39 | Mixture of 4,4'-bis(α;α'-dimethylbenzyl diphenylamine and zinc salt of 2-mercaptobenzothiazole | 2 | ⊚ | ⊚ | ⊚ | ⊚ | ⊚ | ⊚ | ⊚ |
| Ex. 40 | Tin powder | 0.5 | ⊚ | ○ | ○ | △ | × | × | ×× |
| Ex. 41 | " | 1 | ⊚ | ⊚ | ○ | ○ | ○ | ○ | △ |
| Ex. 42 | " | 2 | ⊚ | ⊚ | ⊚ | ⊚ | ⊚ | ⊚ | ⊚ |
| Ex. 43 | Zinc powder | 2 | ⊚ | ⊚ | ⊚ | ⊚ | ⊚ | ⊚ | ⊚ |
| Ex. 44 | Mixture of tin powder and zinc powder (1 : 1 by weight) | 2 | ⊚ | ⊚ | ⊚ | ⊚ | ⊚ | ⊚ | ⊚ |

(Note)
*Dibutyl tin mercaptide commercially available under the tradename "AP-52" made by Tokyo Fine Chemical Kabushiki Kaisha.

EXAMPLES 45 TO 48 AND COMPARATIVE EXAMPLES 2 TO 4

The procedures of the preceeding Examples were repeated except that a melt-processable fluorine-containing resin (particle size: 60 meshes pass) and a thermal stabilizer were employed as shown in Table 2 where the composition of VdF-TFE copolymer was VdF/TFE=87/13 by weight and particle sizes of zinc powder and tin powder were 1 to 2μ and not more than 74μ respectively.

The results are shown in Table 2.

TABLE 2

| | Thermal stabilizer | | Fluorine-containing resin | Sintering condition | | State of films | | | |
|---|---|---|---|---|---|---|---|---|---|
| | Kind | Amount (PHR) | | °C. | hour | 200μ | 300μ | 400μ | 600μ |
| Ex. 45 | Tin powder | 2 | VdF homopolymer | 260 | 3 | ⊚ | ⊚ | ⊚ | ⊚ |
| Ex. 46 | Tin powder | 2 | VdF-TFE copolymer | 260 | 3 | ⊚ | ⊚ | ⊚ | ⊚ |
| Ex. 47 | Zinc powder | 2 | VdF homopolymer | 260 | 3 | ⊚ | ⊚ | ⊚ | ⊚ |
| Ex. 48 | Di-β-naphthyl-p-phenylenediamine | 2 | CTFE homopolymer | 300 | 5 | ⊚ | ⊚ | ⊚ | ⊚ |
| Com. Ex. 2 | — | — | VdF homopolymer | 260 | 3 | ⊚ | ○ | △ | × |
| Com. Ex. 3 | — | — | VdF-TFE copolymer | 260 | 3 | ⊚ | ○ | △ | × |
| Com. Ex. 4 | — | — | CTFE homopolymer | 300 | 5 | ⊚ | △ | × | ×× |

EXAMPLE 49

The same 50 liter kneader as employed in the preceeding Examples was charged with 10 kg. of TFE-HFP copolymer (TFE/HFP=85/15 by weight) having a particle size of 60 meshes pass and a prescribed amount of tin powder stabilizer having a particle size of not more than 43μ, and dry blending was carried out for 30 minutes at a speed of 1,500 r.p.m. to give a fluorine-containing resin composition in the form of powder.

The composition was placed in a fluidized bed. The powder was fluidized and a steel plate having a thickness of 10 mm. which was previously preheated to 380° C. was dipped in the fluidized powder layer to adhere the powder to the plate in such an amount as to give, after sintering, a film having a thickness of 500±50μ.

The thus obtained coating test specimen was placed in a hot air circulating oven, and was sintered under varied temperature and time conditions to determine critical sintering condition under which a film leaving no traces of bubbles could be obtained.

The results are shown in FIG. 1, in which curves 1, 2, 3 and 4 show the cases using tin powder in amounts of 0.5, 1, 2 and 3 parts, respectively, per 100 parts of the resin.

EXAMPLE 50

The procedures of Example 49 were repeated except that a mixture of tin powder having a particle size of not more than 74μ and zinc powder having a particle size of 1 to 2μ (2:1 by weight).

Figure 2:
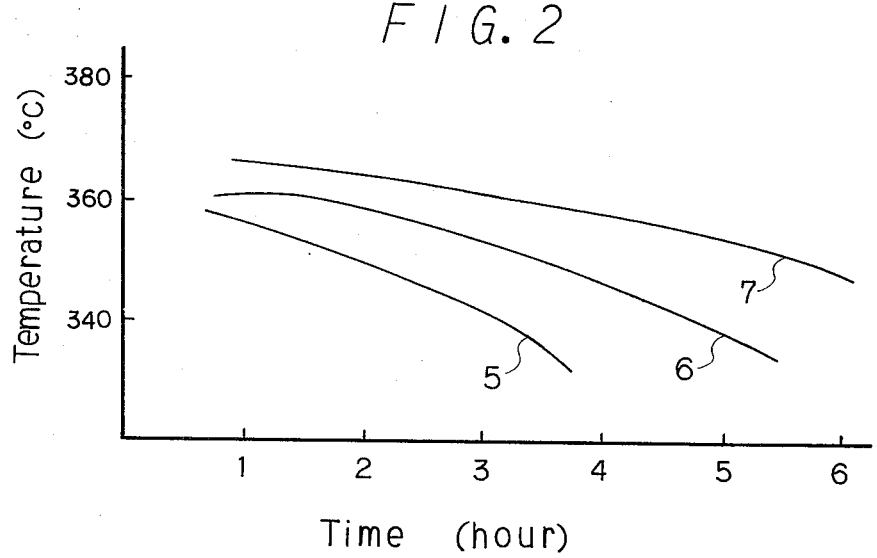

The results of the determination of critical sintering condition are shown in FIG. 2, in which curves 5, 6 and 7 show the cases using the mixture as a thermal stabilizer in amounts of 0.5, 1 and 2 parts, respectively, per 100 parts of the resin.

EXAMPLE 51

The procedures of Example 49 were repeated except that 0.5 part of carbon black per 100 parts of the resin was further employed as a pigment in addition to the resin and the thermal stabilizer.

Figure 3:
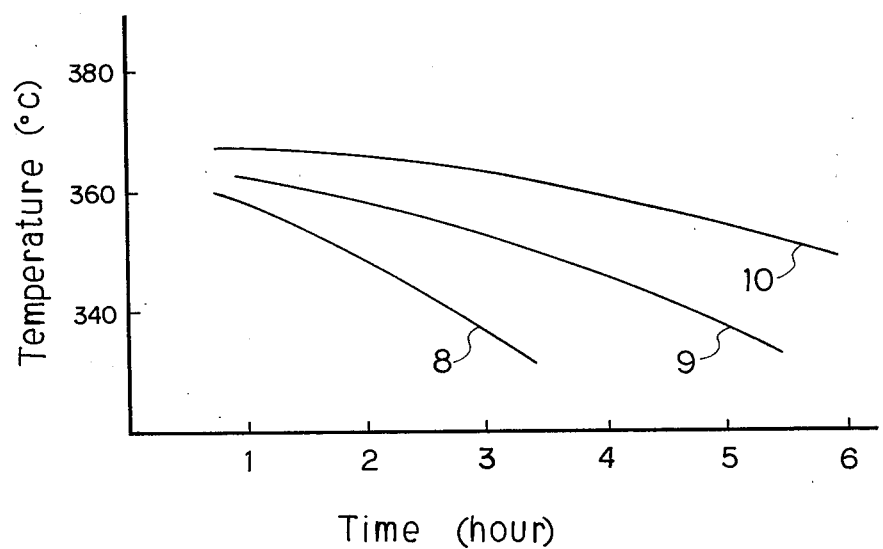

The results of the determination of critical sintering condition are shown in FIG. 3, in which curves 8, 9 and 10 show the cases using the tin powder stabilizer in amounts of 0.5, 1 and 2 parts, respectively, per 100 parts of the resin.

It is observed from the comparison of FIG. 3 with FIG. 1 that the thermal stabilization effect cannot be impaired by the addition of additives such as pigments and reinforcing agents.

EXAMPLES 52 TO 73 AND COMPARATIVE EXAMPLES 5 TO 9

A melt-processable fluorine-containing resin composition in the form of powder was prepared in the same manner as in Examples 1 to 44 except that a fluorine-containing resin having a particle size of 60 meshes pass and a thermal stabilizer were employed as shown in Table 2.

The composition was placed in a fluidized bed, and the powder was fluidized. A steel plate having a thickness of 10 mm. which was previously preheated to 350° C. was then dipped to adhere the powder to the plate. The powder adhered to the plate was then sintered under a condition shown in Table 2 to give a test specimen having a film of 300±50µ in thickness.

The thus obtained test specimen was placed in an autoclave containing high pressure saturated steam, and steam resistance test was carried out. The high pressure steam resistance of the film was judged according to the following criteria.

○ : No change

△ : Whitening (a large number of fine hair cracks being observable by a microscope of about 40 magnifications)

✕ : Occurrence of cracks observable by the naked eye.

The results of the high pressure steam resistance are shown in Table 2 together with the results of Comparative Examples where no thermal stabilizer was employed. In Table 2, the employed zinc powder and tin powder are those having particle sizes of 1 to 2µ and not more than 74µ, respectively.

As is clear from the results, the compositions containing thermal stabilizers prepared according to the present invention have an improved durability to sintering, while the films containing no thermal stabilizer as shown in Comparative Examples are thermally deteriorated in part under a severe sintering condition and is colored and it is considered that this causes lowering of the stress crack resistance in a high pressure steam.

TABLE 3

| | Fluorine-containing resin | | | Thermal stabilizer | | High pressure steam resistance | | |
|---|---|---|---|---|---|---|---|---|
| | Kind (weight ratio) | Sintering condition °C. | hour | Kind | Amount PHR | 120° C. 40 days | 140° C. 7 days | 160° C. 1 day |
| Com. Ex. 5 | E/P/TFE = 17.0/6.5/76.5 | 290 | 0.5 | — | — | △ | △ | ✕ |
| Com. Ex. 6 | E/P/TFE = 17.0/6.5/76.5 | 270 | 2 | — | — | ✕ | ✕ | ✕ |
| Ex. 52 | E/P/TFE = 17.0/6.5/76.5 | 270 | 2 | Tetramethylthiuram disulfide | 1 | ○ | ○ | △~○ |
| Ex. 53 | E/P/TFE = 17.0/6.5/76.5 | " | " | Tetramethylthiuram disulfide | 2 | ○ | ○ | △ |
| Ex. 54 | E/P/TFE = 17.0/6.5/76.5 | " | " | Di-β-naphthyl-p-phenylene-diamine | 2 | ○ | △ | ✕ |
| Ex. 55 | E/P/TFE = 17.0/6.5/76.5 | " | " | Di-β-naphthyl-p-phenylene-diamine | 3 | ○ | △~○ | ✕ |
| Ex. 56 | E/P/TFE = 17.0/6.5/76.5 | " | " | Zinc salt of 2-mercaptobenzo-imidazole | 1 | ○ | | ✕ |
| Ex. 57 | E/P/TFE = 17.0/6.5/76.5 | " | " | Zinc salt of 2-mercaptobenzo-imidazole | 2 | ○ | | △~○ |
| Ex. 58 | E/P/TFE = 17.0/6.5/76.5 | " | " | Zinc dibutyldithiocarbamate | 1 | ○ | △~○ | △ |
| Ex. 59 | E/P/TFE = 17.0/6.5/76.5 | " | " | " | 2 | ○ | ○ | ○ |
| Com. Ex. 7 | E/CTFE = 19.5/80.5 | 250 | 0.5 | — | — | △~○ | △~○ | △ |
| Com. Ex. 8 | E/CTFE = 19.5/80.5 | 260 | 2 | — | — | ✕ | ✕~△ | ✕ |
| Ex. 60 | E/CTFE = 19.5/80.5 | 260 | 2 | Zinc salt of 2-mercapto-benzothiazole | 2 | ○ | ○ | △~○ |
| Ex. 61 | E/CTFE = 19.5/80.5 | " | " | Zinc salt of 2-mercapto-benzoimidazole | 2 | ○ | ○ | ○ |
| Ex. 62 | E/CTFE = 19.5/80.5 | " | " | Reaction product of diphenyl-amine and diisobutylene | 2 | ○ | ○ | △ |
| Ex. 63 | E/CTFE = 19.5/80.5 | " | " | Reaction product of diphenyl-amine and diisobutylene | 3 | ○ | ○ | ○ |
| Ex. 64 | E/CTFE = 19.5/80.5 | " | " | Zinc ethylphenyldithio-carbamate | 2 | ○ | ○ | △ |
| Ex. 65 | E/CTFE = 19.5/80.5 | " | " | Zinc ethylphenyldithio-carbamate | 3 | ○ | ○ | ○ |
| Ex. 66 | E/CTFE = 19.5/80.5 | " | " | Tetramethylthiuram disulfide | 1 | ○ | △ | ✕ |
| Ex. 67 | E/CTFE = 19.5/80.5 | " | " | Tetramethylthiuram disulfide | 2 | ○ | △~○ | ✕ |
| Ex. 68 | E/P/TFE = 17.0/6.5/76.5 | 270 | 2 | Tin powder | 0.5 | ○ | ○ | △~○ |

TABLE 3-continued

| | Fluorine-containing resin | Sintering condition | | Thermal stabilizer | | High pressure steam resistance | | |
|---|---|---|---|---|---|---|---|---|
| | Kind (weight ratio) | °C. | hour | Kind | Amount PHR | 120° C. 40 days | 140° C. 7 days | 160° C. 1 day |
| Ex. 69 | E/P/TFE = 17.0/6.5/76.5 | " | " | " | 1 | ○ | ○ | Δ |
| Ex. 70 | E/CTFE = 19.5/80.5 | 260 | 2 | Tin powder | 2 | ○ | ○ | X |
| Ex. 71 | E/CTFE = 19.5/80.5 | 260 | 0.5 | Mixture of tin and zinc powders (1 : 1 by weight) | 2 | ○ | ○ | ○ |
| Com. Ex. 9 | E/TFE = 19.8/80.2 | 320 | 2 | — | — | Δ | Δ~X | X |
| Ex. 72 | E/TFE = 19.8/80.2 | 320 | 2 | Tin powder | 1 | ○ | ○ | ○ |
| Ex. 73 | " | " | " | Zinc powder | 1 | ○ | Δ~○ | ○ |

(Note)
E: Ethylene
P: Propylene

EXAMPLES 74 TO 91 AND COMPARATIVE EXAMPLE 10

In a ball mill, 200 parts of xylene, 350 parts of cyclohexane, 300 parts of finely divided TFE-HFP copolymer TFE/HFP=86/14 by weight) having a particle size of 150 meshes pass and a prescribed amount of a thermal stabilizer as shown in Table 4 were blended for 24 hours to give a dispersion of resin and stabilizer in organic solvent.

The obtained dispersion was sprayed to aluminum plates to give coated plates having coatings of various thicknesses. After drying the coatings in an infrared dryer maintained at 100° C., the coated plates were placed in a hot air circulating type electric oven and then sintered at 350° C. for 1.5 hours. Limit thickness to bubble formation being capable of providing a good sintered film leaving no traces of bubbles was then judged.

The results are shown in Table 4, in which the employed zinc powder and tin powder are those having particle sizes of 1 to 2μ and not more than 43μ, respectively.

As is clear from the results shown in Table 4, fluorine-containing resin compositions in the form of dispersion of the present invention can be coated more thickly as compared with the dispersion not containing thermal stabilizer obtained in Comparative Example 10.

TABLE 4

| | Thermal stabilizer | | Limit thickness to bubble formation in sintered film(μ) |
|---|---|---|---|
| Kind | Kind | Amount (PHR) | |
| Com. Ex. 10 | — | — | 70 to 80 |
| Ex. 74 | Di-β-naphthyl-p-phenylenediamine | 1 | 120 to 130 |
| Ex. 75 | " | 2 | 200 to 220 |
| Ex. 76 | Reaction product of diphenylamine and diisobutylene | 1 | 150 to 170 |
| Ex. 77 | Reaction product of diphenylamine and diisobutylene | 2 | 250 to 260 |
| Ex. 78 | Zinc salt of 2-mercaptobenzoimidazole | 0.5 | 150 to 160 |
| Ex. 79 | Zinc salt of 2-mercaptobenzoimidazole | 1 | 240 to 250 |
| Ex. 80 | Tin salt of 2-mercaptobenzothiazole | 0.5 | 180 to 200 |
| Ex. 81 | Tin salt of 2-mercaptobenzothiazole | 1 | 280 to 300 |
| Ex. 82 | Zinc dibutyldithiocarbamate | 1 | 190 to 210 |
| Ex. 83 | " | 2 | >300 |
| Ex. 84 | Tetramethylthiuram disulfide | 1 | 120 to 140 |
| Ex. 85 | " | 2 | 180 to 200 |
| Ex. 86 | Dibutyl tin mercaptide* | 0.5 | 160 to 170 |
| Ex. 87 | " | 1 | 220 to 230 |
| Ex. 88 | Zinc powder | 0.5 | 190 to 200 |
| Ex. 89 | " | 1 | >300 |
| Ex. 90 | Tin powder | 0.5 | 210 to 222 |
| Ex. 91 | " | 1 | >300 |

(Note)
*Dibutyl tin mercaptide commercially available under the tradename "AP-52" made by Tokyo Fine Chemical Kabushiki Kaisha

What we claim is:

1. A melt-processable fluorine-containing resin composition having an improved thermal stability which comprises a melt-processable fluorine-containing resin selected from the group consisting of:
   (a) tetrafluoroethylene-hexafluoropropylene copolymers containing tetrafluoroethylene and hexafluoropropylene residues in a weight ratio of 95:5 to 75:25;
   (b) tetrafluoroethylene-perfluorovinyl ether copolymers containing tetrafluoroethylene and perfluorovinyl ether residues in a weight ratio of 98:2 to 90:10;
   (c) tetrafluoroethylene-ethylene copolymers containing tetrafluoroethylene and ethylene residues in a weight ratio of 70:30 to 90:10;
   (d) tetrafluoroethylene-ethylene-propylene copolymers containing tetrafluoroethylene, ethylene and propylene residues in a weight ratio of 40 to 65:25 to 50:2 to 20;
   (e) a chlorotrifluoroethylene homopolymer;
   (f) chlorotrifluoroethylene-ethylene copolymers containing chlorotrifluoroethylene and ethylene residues in a weight ratio of 75:25 to 85:15;
   (g) a vinylidene fluoride homopolymer;
   (h) vinylidene fluoride-tetrafluoroethylene copolymers containing vinylidene fluoride and tetrafluoroethylene residues in a weight ratio of 70:30 to 90:10; and
   (i) vinylidene fluoride-hexafluoroisobutylene copolymers containing vinylidene fluoride and hexafloroisobutylene residues in a weight ratio of 40:60 to 70:30, and a stabilizing amount of at least one thermal stabilizer selected from the group consisting of:

(A) an amine antioxidant selected from the group consisting of dinaphthylamine, phenyl-α-naphthylamine, phenyl-β-naphthylamine, diphenyl-p-phenylenediamine, di-β-naphthyl-p-phenylenediamine, phenylcyclohexyl-p-phenylene diamine, aldol-α-naphthyl-diphenylamine, a reaction product of diphenylamine and diisobutylene, and a diphenylamine derivative having the formula:

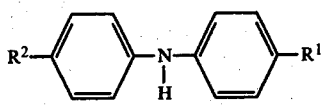

wherein $R^1$ and $R^2$ are

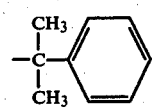

or octyl group; and (B) an organosulfurous compound selected from the group consisting of benzoimidazole type mercaptans having the formula:

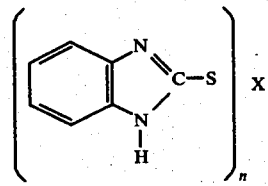

wherein X is H, Zn, Sn or Cd, and n is an integer of 1 to 4; benzothiazole type mercaptan compounds and their salts having the formula:

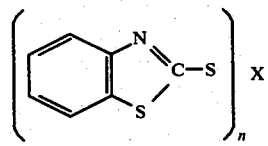

wherein X is H, Zn, Sn or Cd, and n is an integer of 1 to 4; dithiocarbamic acids and their salts having the formula:

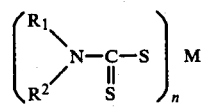

wherein $R^1$ and $R^2$ are an alkyl or aryl group having 2 to 16 carbon atoms, M is H, Zn, Sn, Cd or Cu and n is an integer of 1 to 4; a thiuram compound having the formula:

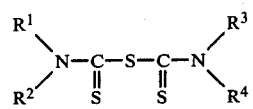

wherein $R^1$, $R^2$, $R^3$ and $R^4$ are an alkyl or aryl group having 2 to 16 carbon atoms; and a thiuram compound having the formula:

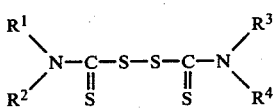

wherein $R^1$, $R^2$, $R^3$ and $R^4$ are an alkyl or aryl group having 2 to 16 carbon atoms.

2. The composition of claim 1 wherein said thermal stabilizer is present in an amount of 0.05 to 10 parts by weight per 100 parts by weight of the resin.

3. The composition of claim 1 wherein said melt-processable fluorine-containing resin is a tetrafluoroethylene copolymer or a chlorotrifluoroethylene copolymer.

4. The composition of claim 1 wherein said melt-processable fluorine-containing resin is a tetrafluoroethylene-hexafluoropropylene copolymer.

5. The composition of claim 1 in which the thermal stabilizer is the amine antioxidant.

6. The composition of claim 1 in which the thermal stabilizer is the organosulfurous compound.

7. A melt-processable fluorine-containing resin composition having an improved thermal stability which comprises a melt-processable fluorine-containing resin selected from the group consisting of: (a) tetrafluoroethylene-hexafluoropropylene copolymers containing tetrafluoroethylene and hexafluoropropylene residues in a weight ratio of 95:5 to 75:25, (b) tetrafluoroethylene-perfluorovinyl ethers containing tetrafluoroethylene and perfluorovinyl ether residues in a weight ratio of 98:2 to 90:10, (c) tetrafluoroethylene-ethylene copolymers containing tetrafluoroethylene and ethylene residues in a weight ratio of 70:30 to 90:10, (d) tetrafluoroethylene-ethylene-propylene copolymers containing tetrafluoroethylene, ethylene and propylene residues in a weight ratio of 40 to 60: 25 to 50:2 to 20, (e) a chlorotrifluoroethylene homopolymer, (f) chlorotrifluoroethyleneethylene copolymers containing chlorotrifluoroethylene and ethylene residues in a weight ratio of 75:25 and 85:15, (g) a vinylidene fluoride homopolymer, (h) vinylidene fluoride-tetrafluoroethylene copolymers containing vinylidene fluoride and tetrafluoroethylene residues in a weight ratio of 70:30 to 90:10, and (i) vinylidene fluoride-hexafluoroisobutylene copolymers containing vinylidene fluoride and hexafluoroisobutylene residues in a weight ratio of 40:60 to 70:30 and 0.05 to 10 parts by weight of at least one thermal stabilizer selected from the group consisting of tin powder and zinc powder per 100 parts by weight of the resin.

8. The composition of claim 7 wherein said melt-processable fluorine-containing resin is a tetrafluoroethylene copolymer or a chlorotrifluoroethylene copolymer.

9. The composition of claim 7 wherein said melt-processable fluorine-containing resin is a tetrafluoroethylene-hexafluoropropylene copolymer.

* * * * *